United States Patent
Kim et al.

(10) Patent No.: US 7,419,614 B2
(45) Date of Patent: Sep. 2, 2008

(54) METHOD OF ETCHING AND CLEANING OBJECTS

(75) Inventors: Jeong-Jin Kim, Kyoungsangbuk-do (KR); Il-Ryong Park, Kyoungsangbuk-do (KR); Hae-Joo Choi, Kyoungsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 935 days.

(21) Appl. No.: 09/727,516

(22) Filed: Dec. 4, 2000

(65) Prior Publication Data

US 2002/0066533 A1    Jun. 6, 2002

(51) Int. Cl.
*B44C 1/22* (2006.01)
(52) U.S. Cl. .............................. 216/83; 134/1.3; 134/3; 134/30; 134/902
(58) Field of Classification Search .................. 216/83, 216/92; 134/1.3, 902
See application file for complete search history.

(56) References Cited

U.S. PATENT DOCUMENTS 4,633,893 A * 1/1987 McConnell et al. ........ 134/95.1
6,350,322 B1 * 2/2002 Yates ............................ 134/3

FOREIGN PATENT DOCUMENTS

JP          03296218 A    * 12/1991

* cited by examiner

*Primary Examiner*—Anita K Alanko
(74) *Attorney, Agent, or Firm*—Birch, Stewart, Kolasch & Birch, LLP

(57) ABSTRACT

A method of etching and cleaning objects contained in a vessel, includes etching the objects by providing etching solution into the vessel, forcing out the etching solution from the vessel by providing pressurized gas into the vessel; cleaning the objects by providing cleaning solution into the vessel; and draining the cleaning solution from the vessel. By forcing out the etching solution with a pressurized gas such as nitrogen gas, there is no density difference of the etching solution in contact with the objects, leading to uniform etching of the objects.

17 Claims, 2 Drawing Sheets

METHOD OF ETCHING AND CLEANING OBJECTS

BACKGROUND OF THE INVENTION

1. Field of the Invention

The present invention relates to an etching and cleaning apparatus and method for objects, and more particularly, to an apparatus and method for batch processes for objects such as a semiconductor wafer or a liquid crystal display (LCD) substrate.

2. Description of Related Art

Etching technology is very important for compact and complicated substrates. Etching is followed by a cleaning process.

For a wet etching process a batch type process is usually adopted since it can provide mass production and a low production cost.

FIG. 1 schematically shows an etching apparatus of a batch type according to a conventional art.

A vessel 10 containing substrates 12 has upper and lower openings 111 and 113 and is linked by many pipes. To the upper opening 111 are linked a first supplying pipe 10a and a first draining pipe 10d and to the lower opening 113 are linked a second supplying pipe 10b, a third supplying pipe 10c and a second draining pipe 10e. The first supplying pipe 10a is for supplying IPA (isopropyl alcohol), the second supplying pipe 10b for supplying etching solution, and the third supplying pipe 10c for supplying D.I. (deionized) water. The first draining pipe 10d is for draining etching solution and D.I. water, and the second draining pipe 10e is for draining IPA and D.I. water.

The etching process and rinsing process using the apparatus is explained. First, through the second and the third supplying pipes 10b and 10c, etching solution and D.I. water are supplied to the vessel 10 containing substrates 12, respectively. In some conditions only etching solution can be supplied, since D.I. water is for diluting the etching solution at this time.

Next, the substrates 12 are etched by the etching solution for some time.

Next, D.I. water is supplied through the third supplying pipe 10c so as to push the mixture of etching solution and D.I. water to the upper opening 111 for draining through the first draining pipe 10d. At this time D.I. water cleans the substrates 12.

Finally, D.I. water is drained through the second draining pipe 10e and IPA is supplied to the vessel 10 in order to dry the substrates 12.

However, referring to FIG. 2, during draining, the etching solution densities of the etching solution differ depending on the location of the interface of the etching solution and the D.I. water for cleaning. That is, in a certain instant during that process the density is high at the upper portion 12a of the vessel 10 and low at the middle portion 12b of the vessel, whereas at the lower portion 12c of the vessel 10 cleaning water such as D.I. water is filled. This density difference results in non-uniform etching of the substrate 12 depending on the position of the substrate 12.

During that time, while etching solution of high density is mixed with D.I. water for cleaning, an abnormal reaction such as an electric reaction occurs. When two metal layers on the substrate are etched in one process, some metals such as aluminum lose their electrons and some metals such as titanium receive the electrons. Donor metal is over etched, and the donee metal is etched less, which deteriorates the quality of etching.

SUMMARY OF THE INVENTION

To overcome the problems described above preferred embodiments of the present invention provide an apparatus for and a method of etching and cleaning objects which can achieve uniform etching.

A preferred embodiment of the present invention provides an apparatus for etching and cleaning objects, including: a vessel having an upper opening and a lower opening; a first supplying pipe connected to the upper opening of the vessel, the first supplying pipe supplying dry gas; a second supplying pipe connected to the lower opening of the vessel, the second supplying pipe supplying etching solution; a third supplying pipe connected to the lower opening of the vessel, the third supplying pipe supplying cleaning solution; a first draining pipe connected to the upper opening of the vessel, the first draining pipe draining the cleaning solution; and a second draining pipe connected to the lower opening of the vessel, the second draining pipe draining the etching solution and the dry gas.

It is preferred that the second draining pipe is directly and straightly connected to the lower opening of the vessel and has a larger inner diameter than other pipes.

It is also preferred that in the second draining pipe a pump for draining etching solution is installed.

According to another aspect of the invention, the method of etching and cleaning objects contained in a vessel, includes: etching the objects by providing etching solution into the vessel; forcing out the etching solution from the vessel by providing pressurized gas into the vessel; cleaning the objects by providing cleaning solution into the vessel; and draining the cleaning solution from the vessel.

Draining the cleaning solution and forcing out etching solution are processed through different draining pipes connected to the vessel.

The pressurized gas is preferably nitrogen gas.

The etching solution is preferably Oxalic acid solution or diluted Oxalic acid solution.

The cleaning solution is preferably deionized water.

Forcing out the etching solution is preferably done while pumping the etching solution out of the vessel.

The method may further include drying the objects by providing drying gas into the vessel after draining the cleaning solution. The drying gas may include IPA.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF PREFERRED EMBODIMENTS

Reference will now be made in detail to preferred embodiments of the present invention, example of which is illustrated in the accompanying drawings.

A preferred embodiment of the present invention relates to a batch type apparatus for etching and cleaning the objects such as semiconductor wafers or substrates for LCDs.

Figure 1:
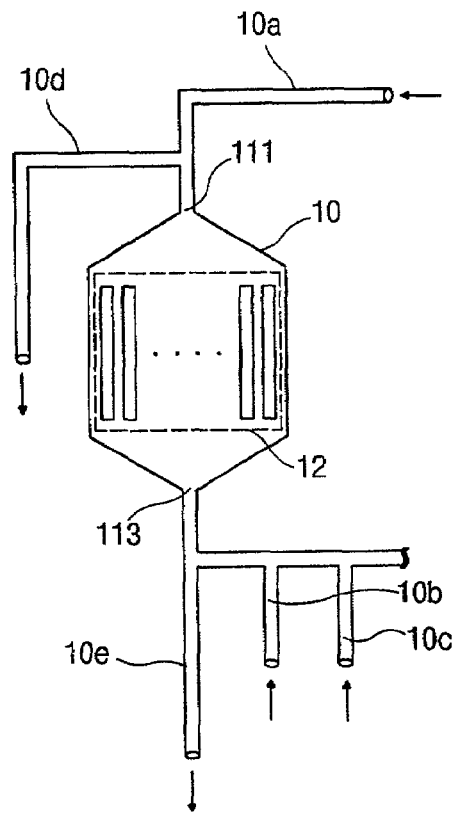
FIG. 1 is a schematic view of an apparatus for etching and cleaning objects according to a conventional art.
Figure 2:
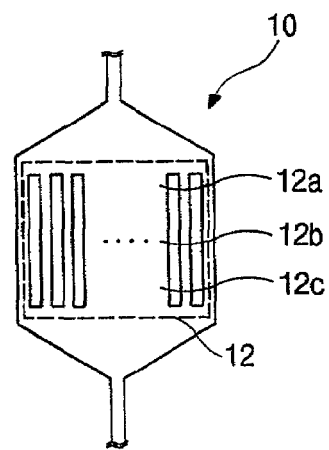
FIG. 2 is a similar view to FIG. 1, illustrating density difference in the vessel during the cleaning process while using the apparatus of FIG. 1.
Figure 3:
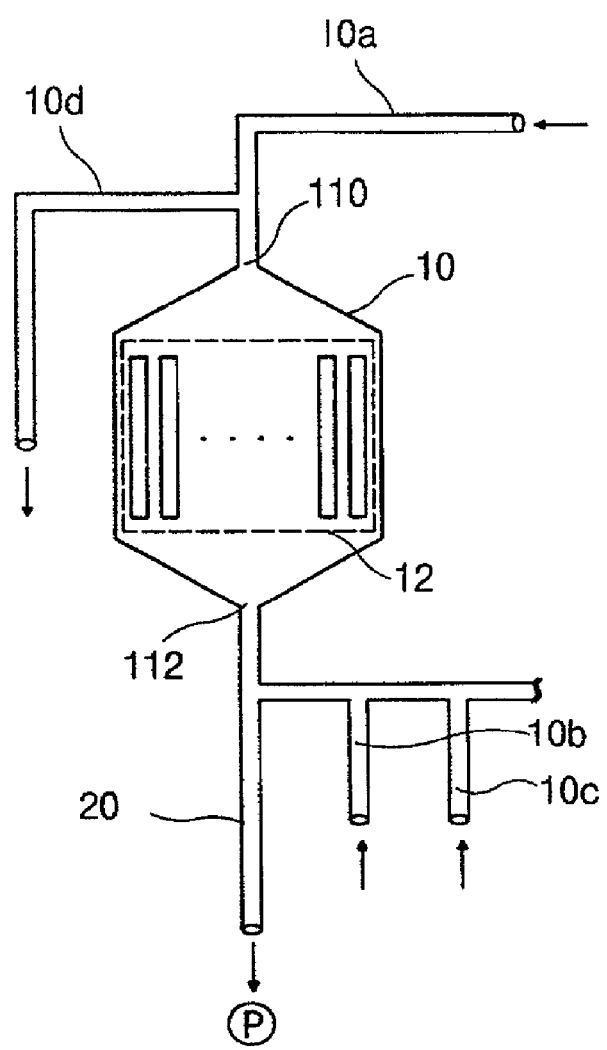
FIG. 3 is a schematic view of an apparatus for etching and cleaning objects according to an embodiment of the invention.

The apparatus shown in FIG. 3 has a vessel 10 having upper and lower openings 110 and 112, which are connected to various pipes. The pipes connected to the upper opening 110 are a first supplying pipe 10a and a first draining pipe 10d, and the pipes connected to the lower opening 112 are second and third supplying pipes 10b and 10c and a second draining pipe 20. Though not illustrated in the drawings, there are valves in the pipes for selectively closing the pipes.

The first supplying pipe 10a is directly connected to the upper opening 110 of the vessel 10, and the first draining pipe 10d branches off from the main passage from the upper opening 110. The second draining pipe 20 is preferably straightly connected to the lower opening 112 of the vessel 10, and the second and third supplying pipes 10b and 10c branch off from the main passage from the lower opening 112 of the vessel 10. Since the second draining pipe 20 is straightly connected to the lower opening 112 of the vessel 10, draining through the second draining pipe 20 can be done without any bottleneck. The second draining pipe 20 can have larger inner diameter than inner diameters of other pipes, and have a pump "P" in order to facilitate easy draining.

Through the first supplying pipe 10a, pressurized gas and drying gas are supplied to the vessel 10. The pressurized gas needs to have a relatively low solubility to the etching solution and can be nitrogen gas. For drying gas, IPA (isopropyl alcohol) can be used. Through the second supplying pipe 10b, an etching solution such as oxalic acid is supplied to the vessel 10. Through the third supplying pipe 10c, cleaning solution such as deionized water is supplied to the vessel 10.

The etching and cleaning process using the apparatus of the embodiment is explained.

First, through the second supplying pipe 10b etching solution is supplied to the vessel 10 having objects 12. At this time, in order to dilute the etching solution, cleaning solution such as D.I. water can be supplied to the vessel 10 at the same time.

Next, the objects are exposed to the etching solution for a determined amount of time.

Next, through the first supplying pipe 10a, pressurized gases such as nitrogen gas are pushed into the vessel in order to drain or force out the etching solution or the etching solution mixed with the diluting solution through the second draining pipe 20. At this time, the second draining pipe 20 is open and the pump "P" is operated for easy draining. The pressurized gas is preferably chosen from a group consisting of gases which do not react with the etching solution.

Next, the cleaning solution, for example D.I. water, is supplied into the vessel 10 through the third supplying pipe 10c in order to clean the objects, and then drained through the first draining pipe 10d.

Next, for the drying process, IPA gas is supplied through the first supplying pipe 10a and drained through the second draining pipe 20.

According to the embodiment of the invention, since the cleaning solution and the etching solution do not form any interface during forcing out of the etching solution, there is no density difference of the etching solution applied to the objects during the process, which results in no electrical reaction during the process, leading to uniform etching for objects.

What is claimed is:

1. A method of etching and cleaning objects contained in a vessel, comprising the steps of:
   introducing an etching solution into the vessel from below the objects;
   etching the objects with the etching solution;
   introducing a pressurized gas into the vessel from above the objects to force the etching solution out of the vessel from below the objects;
   cleaning the objects by introducing a cleaning solution into the vessel from below the objects; and
   draining the cleaning solution from the vessel from above the objects.

2. The method of claim 1, wherein the sequential steps of forcing out the etching solution alone and draining the cleaning solution are carried out through different draining pipes connected to the vessel.

3. The method of claim 1, wherein the pressurized gas is nitrogen gas.

4. The method of claim 1, wherein the etching solution is Oxalic acid solution or diluted Oxalic acid solution.

5. The method of claim 1, wherein the cleaning solution is deionized water.

6. The method of claim 1, wherein the step of forcing out the etching solution is enhanced by pumping the etching solution out of the vessel.

7. The method of claim 1, further comprising:
   drying the objects by providing drying gas into the vessel after draining the cleaning solution.

8. The method of claim 7, wherein the drying gas includes isopropyl alcohol.

9. The method of claim 1, wherein the step of cleaning the objects by introducing the cleaning solution into the vessel from below the objects is performed after the step of introducing the pressurized gas into the vessel from above the objects to force the etching solution out of the vessel from below the objects.

10. A method of etching and cleaning objects contained in a vessel, comprising the steps of:
    etching the objects with an etching solution in the vessel;
    forcing the etching solution out of the vessel from below the objects by introducing a pressurized gas into the vessel from above the objects;
    after the etching solution is forced out by the pressurized gas, cleaning the objects by introducing a cleaning solution into the vessel from below the objects; and
    draining the cleaning solution from the vessel from above the objects.

11. The method of claim 10, wherein the sequential steps of forcing out the etching solution alone and draining the cleaning solution are carried out through different draining pipes connected to the vessel.

12. The method of claim 10, wherein the pressurized gas is nitrogen gas.

13. The method of claim 10, wherein the etching solution is Oxalic acid solution or diluted Oxalic acid solution.

14. The method of claim 10, wherein the cleaning solution is deionized water.

15. The method of claim 10, wherein the step of forcing out the etching solution is enhanced by pumping the etching solution out of the vessel.

16. The method of claim 10, further comprising:
 drying the objects by providing drying gas into the vessel after draining the cleaning solution.

17. The method of claim 16, wherein the drying gas includes isopropyl alcohol.

\* \* \* \* \*